(12) United States Patent
Edelen et al.

(10) Patent No.: US 10,429,810 B2
(45) Date of Patent: Oct. 1, 2019

(54) FLUIDIC DEVICE CONTROL

(71) Applicant: Funai Electric Co., Ltd, Osaka (JP)

(72) Inventors: J. Glenn Edelen, Versailles, KY (US); Bruce A. Deboard, Georgetown, KY (US); Lucas D. Barkley, Lexington, KY (US)

(73) Assignee: Funai Electric Co. Ltd., Osaka (JP)

( * ) Notice: Subject to any disclaimer, the term of this patent is extended or adjusted under 35 U.S.C. 154(b) by 455 days.

(21) Appl. No.: 15/175,116

(22) Filed: Jun. 7, 2016

(65) Prior Publication Data
US 2017/0351235 A1 Dec. 7, 2017

(51) Int. Cl.
*G06F 15/16* (2006.01)
*G05B 19/042* (2006.01)
*H04W 4/80* (2018.01)

(52) U.S. Cl.
CPC ....... *G05B 19/042* (2013.01); *G05B 19/0426* (2013.01); *H04W 4/80* (2018.02); *G05B 2219/37371* (2013.01)

(58) Field of Classification Search
CPC .............. G05B 19/042; G05B 19/0426; G05B 2219/37371; H04W 4/80; G06F 19/3418; G06F 19/3468; A61M 2205/3337; A61M 5/168; A61M 5/16804; A61M 2205/33; A61M 2205/3331; A61M 2205/3553
See application file for complete search history.

(56) References Cited

U.S. PATENT DOCUMENTS

| | | | |
|---|---|---|---|
| 5,163,122 A | 11/1992 | Urabe et al. | |
| 6,321,266 B1 | 11/2001 | Yokomizo et al. | |
| 7,072,052 B1 | 7/2006 | Tanahashi et al. | |
| 7,082,608 B1 * | 7/2006 | Wilson | G06F 9/54 709/223 |
| 7,940,664 B2 * | 5/2011 | Cedrone | F04B 49/065 370/230 |
| 9,874,923 B1 * | 1/2018 | Brown | H04W 4/70 |
| 2003/0095157 A1 * | 5/2003 | Comer | B41J 29/393 347/3 |
| 2009/0112630 A1 * | 4/2009 | Collins, Jr. | G16H 40/20 705/3 |

(Continued)

*Primary Examiner* — Chirag R Patel
*Assistant Examiner* — Rachel J Hackenberg
(74) *Attorney, Agent, or Firm* — Luedeka Neely Group, P.C.; Rick Barnes

(57) ABSTRACT

A controller for controlling a microfluidic device. A first computing device receives commands from a user interface in a relatively high level protocol using a standardized command language, converts the commands from the standardized command language into a relatively mid-level protocol, sends the commands in the relatively mid-level protocol, receiving data, converts the data into the standardized command language, and sends the data to the user interface according to the standardized command language. A second computing device receives the commands from the first computing device in the relatively mid-level protocol, converts the commands from the relatively mid-level protocol to at least one relatively lower level protocol that is understood by a microfluidic device that is connected to the controller, receives data from the microfluidic device, and sends the data to the first computing device.

18 Claims, 2 Drawing Sheets

(56) References Cited

U.S. PATENT DOCUMENTS

| | | | | |
|---|---|---|---|---|
| 2009/0259612 A1* | 10/2009 | Hanson | .................... | H04L 69/22 |
| | | | | 706/47 |
| 2012/0255875 A1* | 10/2012 | Vicente | .................. | A61B 5/002 |
| | | | | 205/782 |
| 2013/0033720 A1 | 2/2013 | Hirayama et al. | | |
| 2013/0204433 A1* | 8/2013 | Gupta | ................. | G06F 19/3468 |
| | | | | 700/239 |
| 2014/0366878 A1* | 12/2014 | Baron | .................... | G16H 40/63 |
| | | | | 128/204.23 |

* cited by examiner

FLUIDIC DEVICE CONTROL

FIELD

This invention relates to the field of fluidic control. More particularly, this invention relates to control of microfluidic devices.

INTRODUCTION

Microfluidics is a broad term that generally denotes the control and operation of devices with fluidic volumes less than one micro-liter. The devices used can be diverse in function, form, and operation, and may include operations such as dispensing, pumping, heating, sensing, and so forth. Given this diversity of devices, there is a commensurate diversity in the structure and protocol for their electronic control. Thus, when setting up and using a selection of such device, such as in a laboratory environment for example, a number of different controllers and protocols must be used for the several devices. This situation adds complexity and expense to the project, and also introduces additional opportunities for mistakes and problems.

What is needed, therefore, is a system that reduces issues such as those described above, at least in part.

SUMMARY

The above and other needs are met by a controller for controlling a microfluidic device. A first computing device receives commands from a user interface in a relatively high level protocol using a standardized command language, converts the commands from the standardized command language into a relatively mid-level protocol, sends the commands in the relatively mid-level protocol, receiving data, converts the data into the standardized command language, and sends the data to the user interface according to the standardized command language. A second computing device receives the commands from the first computing device in the relatively mid-level protocol, converts the commands from the relatively mid-level protocol to at least one relatively lower level protocol that is understood by a microfluidic device that is connected to the controller, receives data from the microfluidic device, and sends the data to the first computing device.

In various embodiments, the first computing device is an embedded Linux processing unit. In some embodiments, the first computing device is a system on a chip processing unit. In some embodiments, the first computing device is a micro processing unit. In some embodiments, the second computing device comprises a field programmable gate array. In some embodiments, the second computing device comprises an application specific integrated circuit.

In some embodiments, the first computing device communicates with the user interface via a Bluetooth protocol. In some embodiments, the first computing device communicates with the user interface via a Wi-Fi protocol. In some embodiments, the first computing device communicates with the user interface via a wired protocol.

In some embodiments, a plurality of microfluidic devices connect to the controller, and the second computing device converts the commands from the relatively mid-level protocol to a selected proprietary protocol associated with a selected one of the microfluidic devices to which the commands are directed.

According to another aspect of the invention there is described a controller for controlling a microfluidic device. An input-output module receives wireless commands from a user interface in a relatively high level protocol using a standardized command language, and sends data to the user interface according to the standardized command language. A first computing device receives the commands from the input-output module, converts the commands from the standardized command language into a relatively mid-level protocol, sends the commands in the relatively mid-level protocol, receives data, and converts the data into the standardized command language. A second computing device receives the commands from the first computing device in the relatively mid-level protocol, converts the commands from the relatively mid-level protocol to at least one relatively lower level protocol that is understood by a microfluidic device that is connected to the controller, receives data from the microfluidic device, and sends the data to the first computing device.

According to yet another aspect of the invention there is described a controller for controlling devices, where at least some of the devices communicate using different and incompatible protocols. The controller includes a computing device that receives commands from a user interface in a first protocol comprising a command language that is standardized for all of the devices. The commands are converted from the command language into a second protocol that is understood by at least one of the devices that is connected to the controller, and then sent to the device in the second protocol. Data is received from the device in the second protocol, and converted into the standardized command language. The data is sent to the user interface according to the standardized command language.

DRAWINGS

Further advantages of the invention are apparent by reference to the detailed description when considered in conjunction with the figures, which are not to scale so as to more clearly show the details in the views, and wherein.

DESCRIPTION

Figure 1:
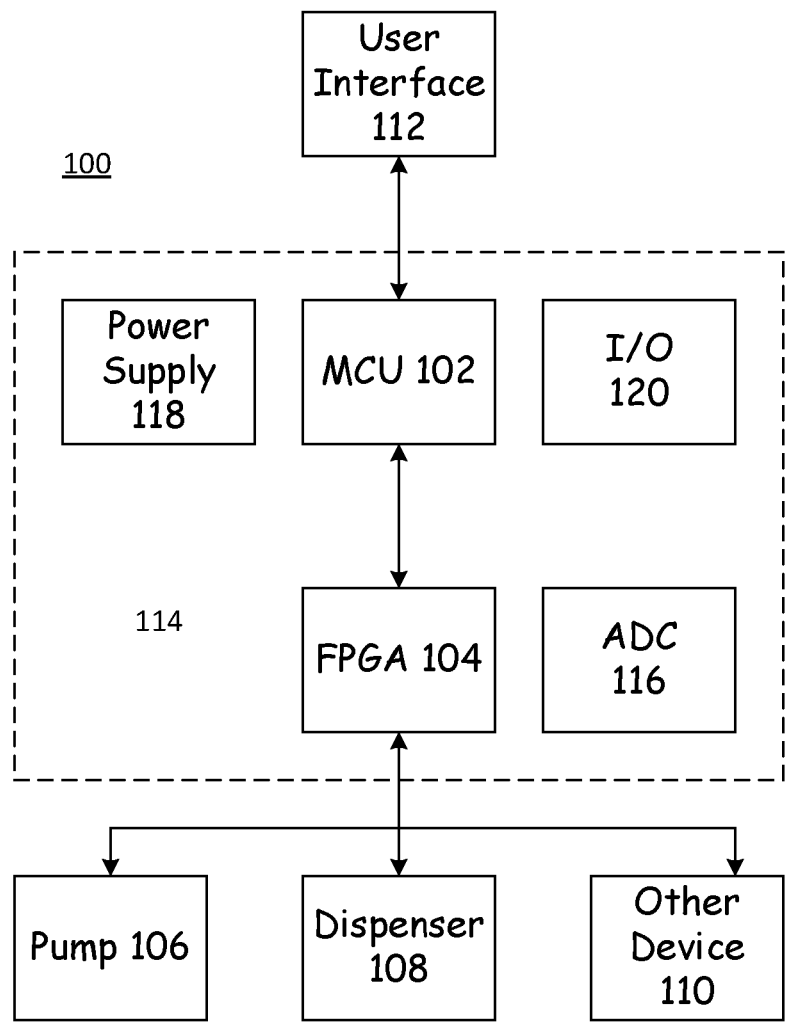
FIG. 1 depicts a functional block diagram of a controller according to an embodiment of the present invention.

With reference now to the Figures, there is depicted in FIG. 1 a microfluidic controller 114 disposed within a system 100, according to an embodiment of the present invention. The controller 114 is comprised in this embodiment of two main parts, which are designated in the drawings as a microcontroller 102 and a field programmable gate array 104. Some embodiments also include additional hardware, such as a power supply 118, input-output module 120, and an analog to digital converter 116. It is appreciated that these designations are by way of example only, and that in various embodiments, other structures having capabilities similar to those as described below are comprehended. In some embodiments the controller 114 is comprised of a single main part, having the combined functions as described below.

The controller 114 receives commands from and provides data to a user interface 112, such as through a Wi-Fi, Bluetooth, or wired data connection. The user interface 112 is, in various embodiments, a computer such as a personal computer, a mainframe computer, a smartphone having computing capabilities, a tablet computer, or other such computing device. The user interface 112 runs a program that enables the user to send commands to the controller 114 in a standardized command language, which makes controlling the microfluidic devices 106, 108, and 110 easier. The program, in various embodiments, uses a command line interface, a graphical interface, a voice interface, a biometric interface, or other known computing device interface.

The standardized command language is referred to herein as Fluidic Command Language, or FCL. Thus, the user programs the controller 114 through the use of a relatively high level FCL, and the FCL commands are sent to the controller 114 and received by the MCU 102.

The MCU 102 receives and interprets the FCL commands that it receives into a mid-level communication protocol, such as register level commands. The MCU 102 can be an actual microcontroller unit, or in other embodiments can be a PC, a Linux based hardware/software system, or some other small embedded system.

The mid-level commands produced by the MCU 102 are received by the FPGA 104, which in some embodiments is an actual field programmable gate array device, but in other embodiments is a different hardware structure with similar capabilities to an FPGA. The FPGA 104 receives the mid-level commands from the MCU 102, and produces low level commands or control signals for the individual microfluidic device 106, 108, and 110.

In response to the low level commands, the devices 106, 108, and 110 perform the functions according to the commands that they have received, and in some instances provide data back to the controller 114, through the FPGA 104. In some embodiments the ADC 116 converts analog data from the devices 106, 108, and 110 prior to passing it to the FPGA 104 in a digital format. The FPGA 104 sends the data to the MCU 102.

In some embodiments the data is converted to some extent from the low level data provided by the devices 106, 108, and 110—each of which may receive commands and produce data in formats that are different, one from the other—into a relatively higher and more standardized format. This data conversion is performed, in various embodiments, by at least one of the FPGA 104 and MCU 102.

The MCU 102 relays the data to the user interface 112 according to the protocols established by the FCL, with the data then being presented to the user. In this manner, the system allows for any number and type of microfluidic devices 106, 108, and 110 to be easily added to the system 100, and controlled by the user.

In some embodiments the functions of the MCU 102 and the FPGA 104 are performed by the same device, such as an FPGA with an embedded microprocessor, a System on a Chip, an ASIC, or any of the other devices described above.

Figure 2:
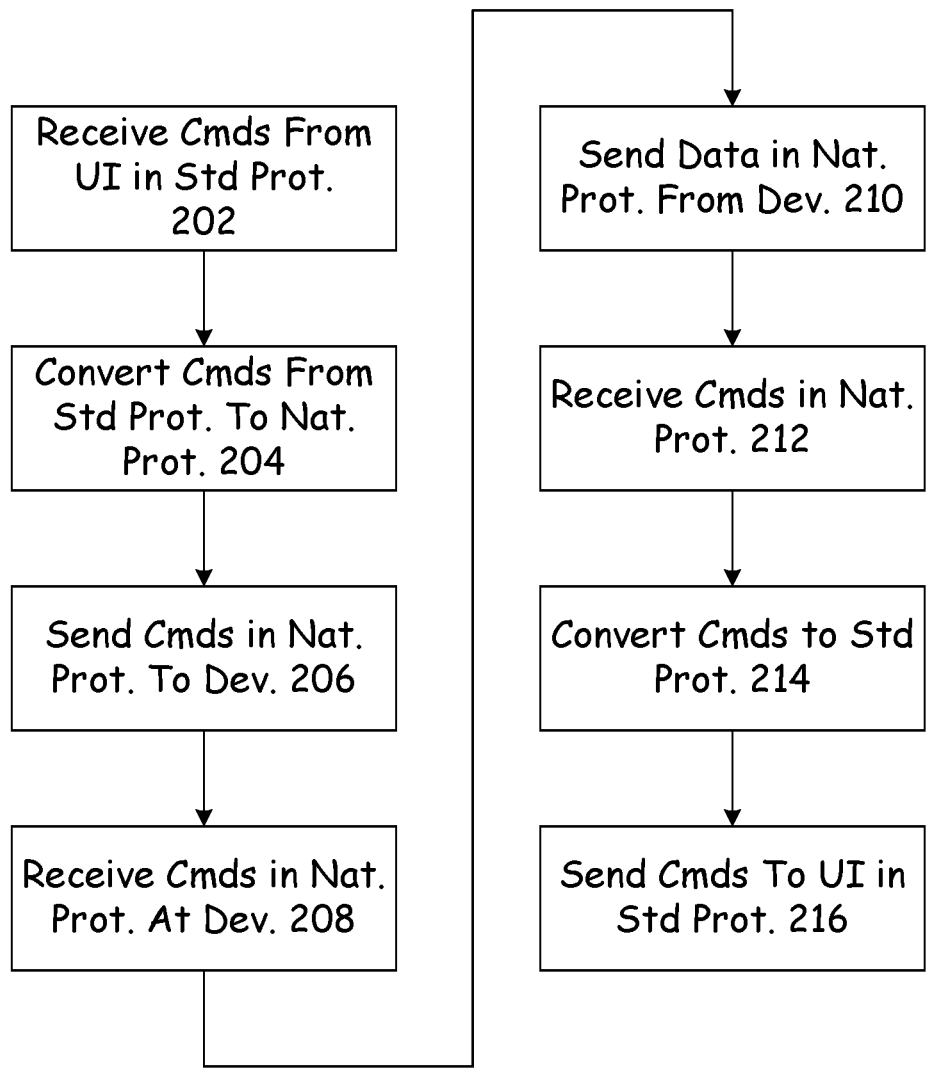
FIG. 2 depicts a flowchart for using a controller according to an embodiment of the present invention.

FIG. 2 depicts a method of using a controller to control devices 106, 108, or 110 that communicate using different and incompatible protocols, according to an embodiment of the present invention. The controller 114 receives commands from the user interface 112 in a standardized protocol, as given in block 202. The controller 114 converts the commands from the standardized protocol to a native protocol that is understood by at least one of the connected devices 106, 108, or 110, as given in block 204. The commands in the native protocol are then sent to the associated device 106, 108, or 110 as given in block 206. The commands are received by the device 106, 108, or 110 in the native protocol, as given in block 208, and the device 106, 108, or 110 takes some kind of action thereon, and produces some kind of feedback, referred to as data in this example.

The device 106, 108, or 110 sends the data in the native protocol that is understood by the device 106, 108, or 110, as given in block 210, and the data is received in the native protocol by the controller 114 as given in block 212. The controller 114 converts the data in the native protocol to the standardized protocol, as given in block 214, and then sends the data in the standardized protocol to the user interface, as given in block 216.

The information below describes one embodiment of the standardized protocol, called FCL.

Syntax Conventions

| | |
|---|---|
| bold | is a command |
| *italics* | is a predefined variable name or file name |
| fixed | is value to be assigned to a variable |
| [] | denotes an optional argument |

Predefined Variables

| | |
|---|---|
| addr | starting address value |
| count | number of times to repeat pattern (overridden if dose is set) |
| closedloop | closed loop thermal control |
| dead | time between pre-fire and fire pulse in ns. For pumps, this is called 'mainfire_delay', but both variable names can be used. |
| delay | time before pre-fire pulse begins |
| dev | device under control (devices defined in configuration file) |
| dose | dose to be delivered in μl (drop volume defined in configuration file) |
| fire | duration of fire pulse in ns. For pumps, this is called 'mainfire', but both variable names can be used interchangeably. |
| freq | firing frequency of heaters in kHz |
| incraddr | value to increment addresses between fires |
| prefire | duration of pre-fire pulse in ns |
| prim | heater primitives to fire (sets simultaneous fires and dispense pattern) |
| stay-at-temp-time | How long to heat chip before beginning fire sequence |
| temp | operating temperature of device in Celsius |
| voltage | heater circuit voltage in volts |
| temperature_warmup | Preheat temperature, can be different than temp. |
| pump_direction | The direction the pump is moving fluid |
| pump_frequency | previously known as transfer period |
| pump_cycle_length | The length of the pump cycle in terms of number of heaters |
| temperature_warmup | Preheat temperature, can be different than temp |
| pump_cycle_time | The frequency of heater firing for pumps |
| pump_pattern | The pump heater pattern to begin with |

The configuration file is a user editable text file maintained in the program startup directory. The file defines physical parameters and valid variable ranges for each device to be controlled.

Commands configurehw

Used to configure the connected device, but does not perform a run. If the button is Pressed after configurehw, then the configured settings should be used.

Example: configurehw

Returns: Configuring HW Success or failure

Note configurehw does not affect the boot defaults of device, if that is desired, please see the save command entry.

connect ipAddress

Used to establish communication between FCL application program and host system.

Example: connect IP_ADDRESS

Returns: Connecting to host

Connected to IP_ADDRESS

Note When a connection is established, the device's current boot default parameters will be communicated to the local application, replacing any current parameters.

On application start, the FCL program will attempt to connect first to localhost, and if that fails, it will try to connect to a device in AP mode.

help|commandName||varName|
If no command name is provided will display a list of all valid commands. If a command name is provided will list help information for the specified command.
list |-n<chipnumber>| or |varName|
Returns the value of the variable provided as an argument.
Example: list fire
Returns: fire parameter for each chip
Example: list -n 2 Returns: lists all parameters for chip 2
If no variable name or chip name is provided the command returns all variables with assigned values.
Example: list temp
Returns: temp=50 C
listdev
Returns the values from the devconfig.ini file for the presently loaded device. Will also display list of available devices in the devconfig.ini file.
Example: listdev
Returns: [dispense1]
   numChips=4
   numAddr=16
   .
   .
   Available Device: ['dispense1', 'pump1, . . . ]
load fileName
Loads the variable values from the file name specified. Any variables not set in the file are assigned a value of 0.
Returns the value of each assigned variable.
Example: load myFile
Returns: file=myFile
   addr=16
   count=5000 dead=800 ns
   .
   .
If the file name specified is not found or there is a read error will return an error message to the user.
loadold fileName
Loads the variable values from the file name specified, expecting the original FCL binary file format. This command is for convenience in case any old binary parameter files are useful. They can be loaded with this command, then saved to the new format with the save command. Any variables not set in the file are assigned a value of 0.
Returns the value of each assigned variable.
Example: loadold myFile
Returns: file=myFile
   addr=16
   count=5000
   dead=800 ns
   .
   .
If the file name specified is not found or there is a read error will return an error message to the user.
ls
List all available parameter files.
Example: ls
Returns: myfile1 myfile2
   .
   .
readhw
Used to read the device's programmed settings and translate them to FCL. This is a debug command and should not be relied upon, but can be used to get an idea of how the device is programmed.
Example: readhw
Returns: reading HW
   Success or failure
Note readhw does not currently read all of the device's programmed settings.
readtemp
Used to read the chip temperatures from the device.
Example: readtemp
Returns: current chip temperatures
reset
Sets all predefined variables to 0.
Returns a list of variables showing that all have been set to 0.
Example: reset
Returns: addr=0
   count=0
   dead=0
   .
   .
retrievelog
The device keeps a log of events since it was started, and this can be used to understand problems if they occur.
Example: retrievelog
Returns: path and filename saved
Note The filename will be overwritten if called more than once, so if a log is important, copy it to a different location or change its filename.
run|<chipnumber list|
Executes the program as defined by the assigned variables. Same action as abutton push on the controller card.
Returns a messages indicating the program is running and a second message when completed, along with any errors or warnings.
RUN ALL CHIPS
   Example: run
   Returns: runningdone
RUN A SUBSET OF CHIPS
   Example: run 1,2,3
   Returns: running
     done
   Run one chip
   Example: run 3
   Returns: running
     done
If there are not enough variables assigned to execute will return an error message to the user.
Note The run command will do a configurehw command first, so it is important that your local parameters are what you intend to run.
save fileName
Saves the variable values to the specified parameter file. Any variables not assigned are saved with a value of 0.
Returns the value of each assigned variable.
Example: save myFile
Returns: file=myFile
   addr=16
   count=5000
   dead=800 ns
   .
   .
If the filename does not exist it will be created. If the filename already exist it will be overwritten without user prompt. If there is an error creating, opening or writing to the file an error message will be returned to the user.
Note Using a special file name, 'bootdefaults.fcl' will trigger an additional sequence of events. The file will be saved locally, but if connected to a device, it will also send this file to the device to be saved as well. When the device is next rebooted, these new defaults will be loaded and ready to run by pressing the button on the device.

scan ipAddress subnet

Used to search a subnet for appropriate devices. When finished, a list of devices will be Presented to the user. This is only useful when running in IP mode instead of AP mode.

Example: scan 192.168.15

Returns: list of devices (if any found)

set varName |-n<chipnumber>| value

The set command is used to assign values to each of the variables required for operation of the device.

The controller is designed to drive multiple microfluidic devices simultaneously or a single device with multiple microfluidic chips. For this reason the set command accepts an optional variable indicating which device or chip the variable is to be applied to. If no designator is supplied the value is assigned to all valid devices. The number of devices is defined in the configuration file. If the designator is out of range as defined in the configuration file an error is issued to the user.

Example: set varName value assigns value to varName for all devices
  set varName –n 2 value
  assigns value to varName for device or chip number 2

Examples of use for each of the predefined variables will be provided.

set addr |-n<chipnumber>| value

Defines the starting address to be used for the run sequence.

Example: set addr 1

Returns: addr=1

If the value is out of range as defined in the configuration file an error message is issued to the user.

set closedloop |-n<chipnumber>| value

Turns off and on closed loop temperature control for each chip. If on, then the chip will not fire until it reaches the desired temperature (see temp parameter). This requires that the chips are temperature calibrated using the tempcal command. (tempcal occurs when the device is booted, but if chips are moved/replaced, then tempcal needs to be done again). If chip is not calibrated, the closed loop setting will be ignored and the chip will be run in open loop control.

0=off/1=on

Example: set closedloop 1

Returns: closedloop set to 1 set count |-n<chipnumber>| value

Defines the number of times the address sequence is to be completed before ending the run. An address sequence is completed when the current address is equal to the starting address value. The address sequence is defined by a starting address, an increment address value and the address architecture as specified in the configuration file. The number of heaters fired in an address sequence is dependent on the increment address selected.

Example: set count 1000

Returns: count=1000

If the value is out of range as defined in the configuration file an error message is issued to the user. If the dose variable is set the count value is ignored.

Note If count is set to 0, this is interpreted as a signal to do continuous jetting for that chip. In this special case, the chip will jet at the specified parameters until a stop command is issued by the user.

set dead |-n<chipnumber>| value

Defines the length of time between the pre-fire and fire pulse inns.

Example: set dead 800

Returns: dead=800 ns

If the value is out of range as defined in the configuration file an error message is issued to the user.

set delay |-n<chipnumber>| value

Defines the delay time before the pre-fire pulse begins inns.

Example: set delay 50

Returns: delay=50 ns

If the value is out of range as defined in the configuration file an error message is issued to the user.

set dev value

Defines the parameters to be loaded from the configuration file. Value is a string which must match a dev statement in the file config.txt. Since the drop size is contained in the dev configuration, it is important to set this correctly in order to get accurate volume output.

Example: set dev dispense1

Returns: dev=dispense1

If the value is not defined in the configuration file an error message is issued to the user.

Note Changing dev can also affect the count variable, if there is a dose value set, the new dev may have a different drop size, and count will be recalculated.

set dose |-n<chipnumber>| value

Defines the volume of fluid in µl to be delivered before ending the run. If dose is set the count variable will be ignored, unless count is intentionally set to 0, which signifies continuous jetting (see count)

Example: set dose 3

Returns: dose=3 ul

The use of dose requires that the drop volume variable is assigned in the configuration file. If not an error message is issued to the user. If the value is out of range as defined in the configuration file an error message is issued to the user.

Note Changing dose will also recalculate the count value, since dose overrides count in practice. If you do not want to use the dose variable, set it to 0.

set fire |-n<chipnumber>| value

Defines the duration of the fire pulse inns.

Example: set fire 1000

Returns: fire=1000 ns

If the value is out of range as defined in the configuration file an error message is issued to the user.

setfreq |-n<chipnumber>| value

Defines the heater firing frequency in Hz. The frequency is defined asthe inverse of the time between fires of the same heater address.

Example: setfreq 1000

Returns: freq=1000 Hz

If the value is out of range as defined in the configuration file an error message is issued to the user.

set incraddr |-n<chipnumber>| value

Defines the number of address to increment between each fire event. The initial fire event will use the address specified by the addr variable. Each subsequent address will be set by adding incraddr to the current address value. The calculated address value wraps around when the value exceeds the number of available addresses specified in the configuration file.

Example: set incraddr 3
Returns: incraddr=3
If the value is out of range as defined in the configuration file an error message is issued to the user.
If incraddr is an odd number, all heaters in the address space will be selected. If incraddr is an even number only the even or odd heaters will be selected dependent on the value set for the addr variable.
set prefire |–n<chipnumber>| value
Defines the duration of the prefire pulse inns.
Example: set prefire 300
Returns: prefire=300 ns
If the value is out of range as defined in the configuration file an error message is issued to the user.
set prim |–n<chipnumber>| value (s)
Defines the address primitives to be selected for the duration of the run. The values are space delimited and can contain any number of values up to number of primitives defined in the configuration file. The keyword all can be used to select all available primitives. Additionally, the keyword off can be used to turn all primitives off.
Example: set prim 1 3 5 7
Returns: prim=1 3 5 7
Example: set prim all
Returns: prim=all
Example: set prim off
Returns: prim=[ ]
If a value is out of range as defined in the configuration file an error message is issued to the user.
Note Changing prim will also affect the count variable, as the count is calculated based on number of fires to reach the dose.
set temp |–n<chipnumber>| value
Defines the temperature set point for the device in degrees Celsius. The run sequence will delay until the specified temperature has been reached. During the run sequence the device will maintain the temperature setpoint.
Example: set temp 50
Returns: temp=50 C
If the value is out of range as defined in the configuration file an error message is issued to the user. The value specified in absolute temperature, not delta from present temperature.
set voltage |–n<chipnumber>| value
Defines the voltage level supplied to the device under control in 0.1V increments.
Example: set voltage 10.5
Returns: voltage =10.5V
If the value is out of range as defined in the configuration file an error message is issued to the user.
set stay-at-temp-time |–n<chipnumber>| value
Defines the time (in ms) that the heaters should come to temperature and stay before firing. This is a long preheat without firing. This feature requires that closed loop be set on the chip also. If not, then it will be ignored.
Example: set stay-at-temp-time 1000
Returns: stay-at-temp-time set to 1000 ms
Currently this value can be in the range 0-85000 ms
set temperature_warmup |–n<chipnumber>| value
Defines the warmup temperature set point for the device in degrees Celsius. This temperature will be used as the temperature for stay-at-temp-time
Example: set temperature_warmup 50
Returns: temp=50 C If the value is out of range as defined in the configuration file an error message is issued to the user. The value specified in absolute temperature, not delta from present temperature.
set pump_direction |–n<chipnumber>| value
Defines the direction that a pump is pumping fluid. Valid values are:
'up'—fire heaters in the direction 1–>n
'down'—fire heaters in the direction n–>1
Example: set direction up
Returns: direction set to up
set pump_frequency |–n<chipnumber>| value
Defines the pump firing window frequency in Hz.
Example: set pump_frequency 1000000
Returns: pump_frequency=1000000 Hz
If the value is out of range as defined in the configuration file an error message is issued to the user.
set pump_cycle_length |–n<chipnumber>| value
Defines the number of heaters used in the pump cycle
Example: set pump_cycle_length 32
Returns: pump_cycle_length=32
If the value is out of range as defined in the configuration file an error message is issued to the user.
set pump_cycle_time |–n<chipnumber>| value
Defines the pump heater firing frequency in Hz. The frequency is defined as the inverse of the time between fires of the same heater address.
Example: set freq 1000
Returns: freq=1000 Hz
If the value is out of range as defined in the configuration file an error message is issued to the user.
set pump_pattern |–n<chipnumber>| value
Defines the pump pattern to be used in the pump cycle. This can be input in decimal, hex (0x prefix), or binary (0b prefix). For hex and binary, the prefix is required.
Example: set pump_pattern 0x80808080
Returns: pump_pattern=0x80808080
Example: set pump_pattern 0b10000000100000001000-000010000000
Returns: pump_ pattern=0b10000000100000001000000-010000000
If the value is out of range as defined in the configuration file an error message is issued to the user.
stop
Issues a reset to the device, which stops all firing. This is used when performing continuous jetting.
Example: stop
Requires: Soft reset done.
tempcal |–n<chipnumber>|
Forces a temperature calibration of the dispense device or pump inserted into the controller. Tempcal will ask for the current ambient temperature in Celsius.
Example: tempcal
Requires: Please enter the current ambient temperature (Celsius):
Returns: calibration completed The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for controlling a fluidic device, the method comprising the steps of:
with a first hardware computing device,
receiving commands from a user interface in a relatively high level protocol comprising a standardized command language,
converting the commands from the standardized command language into a relatively mid-level protocol,
sending the commands in the relatively mid-level protocol,
receiving data,
converting the data into the standardized command language, and
sending the data to the user interface according to the standardized command language, and
with a second hardware computing device that is independent of and separate from the first hardware computing device,
receiving the commands from the first computing device in the relatively mid-level protocol,
converting the commands from the relatively mid-level protocol to at least one relatively lower level protocol that is understood by a fluidic device that is connected to the controller,
receiving data from the fluidic device, and
sending the data to the first computing device,
wherein a plurality of fluidic devices connect to the second hardware computing device, and the second hardware computing device converts the commands from the relatively mid-level protocol to a selected lower level protocol associated with a selected one of the fluidic devices to which the commands are directed.

2. The method of claim 1, wherein the first computing device comprises an embedded Linux processing unit.

3. The method of claim 1, wherein the first computing device comprises a system on a chip processing unit.

4. The method of claim 1, wherein the first computing device comprises a micro processing unit.

5. The method of claim 1, wherein the second computing device comprises a field programmable gate array.

6. The method of claim 1, wherein the second computing device comprises an application specific integrated circuit.

7. The method of claim 1, wherein the first computing device communicates with the user interface via a Bluetooth protocol.

8. The method of claim 1, wherein the first computing device communicates with the user interface via a Wi-Fi protocol.

9. The method of claim 1, wherein the first computing device communicates with the user interface via a wired protocol.

10. A method for controlling a microfluidic device, the method comprising the steps of:
with an input-output module, receiving wireless commands from a user interface in a relatively high level protocol comprising a standardized command language, and
sending data to the user interface according to the standardized command language,
with a first hardware computing device,
receiving the commands from the input-output module,
converting the commands from the standardized command language into a relatively mid-level protocol,
sending the commands in the relatively mid-level protocol,
receiving data, and
converting the data into the standardized command language, and
with a second hardware computing device that is independent of and separate from the first hardware computing device,
receiving the commands from the first computing device in the relatively mid-level protocol,
converting the commands from the relatively mid-level protocol to at least one relatively lower level protocol that is understood by a microfluidic device that is connected to the controller,
receiving data from the microfluidic device, and
sending the data to the first computing device,
wherein a plurality of microfluidic devices connect to the second hardware computing device, and the second hardware computing device converts the commands from the relatively mid-level protocol to a selected low-level protocol associated with a selected one of the microfluidic devices to which the commands are directed.

11. The method of claim 10, wherein the first computing device comprises an embedded Linux processing unit.

12. The method of claim 10, wherein the first computing device comprises a system on a chip processing unit.

13. The method of claim 10, wherein the first computing device comprises a micro processing unit.

14. The method of claim 10, wherein the second computing device comprises a field programmable gate array.

15. The method of claim 10, wherein the second computing device comprises an application specific integrated circuit.

16. The method of claim 10, wherein the input-output module communicates with the user interface via a Bluetooth protocol.

17. The method of claim 10, wherein the input-output module communicates with the user interface via a Wi-Fi protocol.

18. The method of claim 10, wherein the input-output module communicates with the user interface via a wired protocol.

* * * * *